(12) United States Patent
Hörmann et al.

(10) Patent No.: US 11,549,299 B2
(45) Date of Patent: Jan. 10, 2023

(54) DOOR SYSTEM

(71) Applicant: Marantec Antriebs- und Steuerungstechnik GmbH & Co. KG, Marienfeld (DE)

(72) Inventors: Michael Hörmann, Halle/Westfalen (DE); Michael Schwetje, Salzkotten (DE); Marc Hornschuh, Melle (DE)

(73) Assignee: Marantec Antriebs- und Steuerungstechnik GmbH & Co. KG, Marienfeld (DE)

( * ) Notice: Subject to any disclaimer, the term of this patent is extended or adjusted under 35 U.S.C. 154(b) by 245 days.

(21) Appl. No.: 16/286,129

(22) Filed: Feb. 26, 2019

(65) Prior Publication Data

US 2019/0264489 A1  Aug. 29, 2019

(30) Foreign Application Priority Data

Feb. 26, 2018  (DE) ..................... 10 2018 104 314.7

(51) Int. Cl.
| | |
|---|---|
| *E05F 15/40* | (2015.01) |
| *E05F 15/43* | (2015.01) |
| *E05F 15/668* | (2015.01) |
| *E05F 15/665* | (2015.01) |
| *G01V 8/20* | (2006.01) |

(52) U.S. Cl.
CPC .............. *E05F 15/40* (2015.01); *E05F 15/43* (2015.01); *E05F 15/665* (2015.01); *E05F 15/668* (2015.01); *G01V 8/20* (2013.01); *E05F 2015/436* (2015.01); *E05Y 2201/11* (2013.01); *E05Y 2201/684* (2013.01); *E05Y 2400/32* (2013.01); *E05Y 2400/35* (2013.01); *E05Y 2400/354* (2013.01); *E05Y 2400/356* (2013.01); *E05Y 2400/654* (2013.01); *E05Y 2600/456* (2013.01); *E05Y 2600/502* (2013.01); *E05Y 2600/53* (2013.01); *E05Y 2900/106* (2013.01); *E05Y 2900/11* (2013.01)

(58) Field of Classification Search
CPC ................................................ E05D 2015/225
See application file for complete search history.

(56) References Cited

U.S. PATENT DOCUMENTS

| | | | | |
|---|---|---|---|---|
| 1,687,167 A | * | 10/1928 | Mann ................. | H01R 13/6616 337/102 |
| 4,015,122 A | * | 3/1977 | Rubinstein ............... | G01V 8/20 250/221 |
| 5,233,185 A | * | 8/1993 | Whitaker ................. | G01V 8/24 250/222.1 |
| 6,218,940 B1 | * | 4/2001 | Rejc ........................ | E06B 9/82 340/556 |

(Continued)

FOREIGN PATENT DOCUMENTS

| | | |
|---|---|---|
| DE | 19739544 A1 | 3/1999 |
| DE | 202006002000 U1 | 4/2006 |

(Continued)

*Primary Examiner* — Catherine A Kelly
(74) *Attorney, Agent, or Firm* — McCoy Russell LLP

(57) ABSTRACT

Disclosed is a door system comprising: at least one travelable door element; at least one running rail for guiding the door element; and at least one light barrier element for detecting a free travel path of the door element, wherein the at least one running rail has a cut-out at or in which the at least one light barrier element is fastened.

11 Claims, 16 Drawing Sheets

(56) References Cited

U.S. PATENT DOCUMENTS

| | | | |
|---|---|---|---|
| 6,243,006 B1* | 6/2001 | Rejc | E06B 9/82 160/1 |
| 6,939,161 B1* | 9/2005 | Yi | H01R 13/6395 439/373 |
| 7,081,713 B2* | 7/2006 | Jurs | F16P 3/144 250/221 |
| 7,748,431 B2* | 7/2010 | Jansen | E06B 9/13 160/268.1 |
| 8,454,217 B2* | 6/2013 | Liu | G02B 6/0008 362/581 |
| 8,568,015 B2* | 10/2013 | Chen | F21V 23/001 362/654 |
| 10,036,195 B2* | 7/2018 | Iglesias Ballester | E06B 9/581 |
| 10,501,975 B2* | 12/2019 | Hoermann | E06B 3/48 |
| 2015/0282360 A1* | 10/2015 | Oh | G02B 6/3628 385/136 |
| 2019/0257091 A1* | 8/2019 | Hunter | E04F 13/073 |

FOREIGN PATENT DOCUMENTS

| | | |
|---|---|---|
| DE | 202014101131 U1 | 4/2014 |
| EP | 1820928 A2 | 8/2007 |
| JP | 2017014733 A | 1/2017 |

* cited by examiner

DOOR SYSTEM

CROSS-REFERENCE TO RELATED APPLICATIONS

The present application claims priority to German Application No. 10 2018 104 314.7 entitled "DOOR SYSTEM," filed Feb. 26, 2018. The entire contents of the above-listed application are hereby incorporated by reference for all purposes.

TECHNICAL FIELD

The present invention relates to a door system, for example a garage door, an industrial door system, or the like, in which at least one light barrier element is used to secure the travel path of the door.

BACKGROUND AND SUMMARY

The provision of bar-shaped light grids is known from the prior art. For instance, with a door that can be traveled down from above, an approximately vertically oriented light grid at one or both sides of the door is used to check whether there is an obstacle in the travel path of the door. If there is an obstacle, it is communicated to a door control unit that a closing of the door is currently not possible due to the presence of the obstacle in the travel path. Light grids known from the prior art represent a plurality of light barrier elements that are arranged fixedly with respect to one another, that are part of a bar, and that are fixedly molded there. These bars are typically aligned and fastened to the left and right of a door downwardly movable in the closing direction.

It is disadvantageous here that these bars typically have to be up to three meters in length due to different demands. For instance, with industrial door systems that are passed through by forklift trucks, for example, the length of the required light grid is prescribed by law. Shipping is problematic with such bars, which often has the result that a considerable number of these bars reach the destination in damaged form.

The installation of these bar shaped light grids may also be very complex since the bars have to be attached close to the door post on one side. This is, however, not always possible due to construction peculiarities therefore auxiliary construction frequently is prepared or the light grids are arranged in a non-optimum manner (for example too far away from the door). It can also be necessary after an attachment of the light grids present in bar form that an emitting bar that is arranged at one side and that has a plurality of elements for transmitting light has to be adjusted with respect to the receiver bar that receives transmitted light beams. This in particular represents a very great challenge with respect to the installation problems that typically occur.

The manufacture of light grids is also very complex. The plurality of light barrier elements arranged in a bar require an exact alignment with respect to each other since otherwise the desired parallel extent of the transmitted light beams is not ensured. In addition, the electronics arranged in the bar are in most cases sealed with a large amount of potting compound. However, this has the result that a repair of the bar having the light barrier elements is not possible if, for example, an element is impaired. As a rule, when one of the elements breaks, the total system is replaced.

It has additionally been found to be disadvantageous that the number and the spacing of the elements molded in the bar cannot be individually adapted to a specific door system; only the standard spacings of the light grids that are mass produced and are deliverable in this form can be selected. If now as a manufacturer, the attempt is made to meet the high number of varying different demands, a large number of variants have to be manufactured and kept in stock, whereby the typical disadvantages result with respect to storage and production.

The light grids available in bar shape are also unsuitable for the door elements of a door system that are in arch form and that can be traveled downwardly since tracking an arch shape with the aid of the bar elements extending in a straight line is expensive and difficult to implement.

It can be stated in summary that the manufacture and the installation of such a light grid brings along a significant waste of resources. The bars produced from aluminum have a considerable amount of potting compound for the installation of the electronics, require a large amount of installation material, and complex and expensive packaging for shipment due to the substantial dimensions and the sensitive design. As already stated above, the total system likewise typically has to be replaced if repair is needed.

The disadvantages listed above are overcome in part or in full by a door system that includes at least one travelable door element, at least one running rail for guiding the door element, and at least one light barrier element for detecting a free travel path of the door element. The door system is characterized in that the at least one running rail has a cut-out, to or in which the at least one light barrier element is fastened.

It is therefore no longer necessary to provide a bar-shaped light grid element that is to be arranged next to or adjacent the running rail of the door. The light barrier element is rather provided directly in or at the running rail. It is advantageous here that there is now no or almost no spatial displacement of the alignment of the at least one light barrier element toward the actual travel path of the door element. It is thus easier to detect whether an obstacle is present in the travel path of the door element. In addition, it is ensured by the provision of the cutout for the light barrier element in the running rail that even a travel path of the door element in the running rail that does not extend in a straight line, for example, an arch or otherwise curved travel path, can be covered along the running rail by a plurality of light barrier elements at a plurality of mutually spaced apart cut-outs in the running rail. A laborious approximation to a running rail not extending in a straight line by the cutting to size of straight-line light grids in bar form can thus be omitted. Further, the door system can here adopt any desired door design, in particular a roller door or a sectional door.

In accordance with a preferred variant of the invention, the cut-out in the at least one running rail is a passage hole that extends through the running rail. If a plurality of cut-outs are present in the running rail that are provided for the fastening of the light barrier elements, they are located in a common plane. Provision can therefore be made that the normal vectors of the cut-out surfaces in all cut-outs are in parallel with one another.

Provision can further be made that the at least one light barrier element is mainly or completely arranged at the side of the running rail that is remote from the door element. Only limited space that could be used by the arrangement of the light barrier element is typically available at the side of the running rail facing the door element. The rollers connected to the door element are typically guided in the running rail so that an arrangement of the light barrier element at the side of the running rail remote from the door element or from the roller is advantageous.

In accordance with another embodiment of the present invention, the at least one running rail has a plurality of cut-outs along its length for the fastening of the light barrier element, with the cut-outs arranged equidistant from one another and/or extending over the total length of the at least one running rail. Advantages thereby result in the production of the running rail since the cut-outs can be provided in the running rail independently of the later attachment of light barrier elements. If required, a decision can then be made in the sense of a modular expansion that the light barrier elements are fastened in the cut-outs suitable for this purpose or are fastened to the cut-outs suitable for this purpose. It is clear to the skilled person that not every cut-out present in the running rail necessarily has to be provided with a light barrier element, but that naturally only some few can also be provided with a light barrier element. It is thus necessary with some door systems to provide a very high density of light barrier elements in the floor area though this density may be decreased as the distance from the floor increases. Therefore, in some embodiments, more light barrier elements may be arranged at a specific longitudinal dimension in the floor region than in the same longitudinal dimension in a section of the running rail remote from the floor.

In accordance with a further development of the present invention, a plurality of light barrier elements are provided that are fastened to a respective cut-out of the running rail to detect a free travel path of the door element over a larger section by means of a light grid. The fact is accordingly also covered by the invention that a plurality of light barrier elements are fastened to the at least one running rail. A light grid is produced by the plurality of light barrier elements that covers the travel path of the door element.

In accordance with an embodiment of the present invention, the plurality of light barrier elements generating a light grid are components that are separate from one another and that are connected to a common cable by a series connection. A high degree of flexibility in the creation of the light grid can thereby be achieved since a light barrier element is only arranged at desired points in the running rail—adapted to the prevailing circumstances there—and is connected to a light barrier element of the same running rail adjacent thereto in series via a cable. A light grid can thus be generated in a simple manner since the mutually separate light barrier elements can be fastened as required to or in the plurality of cut-outs and can then be connected to a common cable one after the other.

This cable may, for example, deliver the energy required to operate a respective light barrier element and/or can include a data line that transmits an evaluation result of a respective light barrier element. A modularly designable light grid is thereby produced that is variably adaptable to the prevailing circumstances. Provision may additionally be made that the cable is connected to a control unit that controls the door system in dependence on the detection results of the plurality of connected light barrier elements.

In a further modification of the present invention, the door system may further comprise a second running rail for guiding the door element, with the first running rail and the second running rail being arranged at different sides of the door element and with a surface spanned between the two running rails preferably representing an opening coverable by the at least one door element. The two running rails therefore serve the guidance of the door element at both sides of the door element. The two running rails are typically arranged projecting from the floor in a straight line in a door element travelable from top to bottom, but can also have an arcuate shape, typically in a section of the running rail remote from the floor. It is clear to the skilled person that the second running rail can essentially have the same features as were discussed above for the first running rail.

The light barrier element may be a transmission light barrier element and/or a reception light barrier element. Provision may be made on the presence of two running rails at oppositely disposed sides of the door element that only transmission light barrier elements are present at the running rail of the one side and only corresponding reception light barrier elements are present at the running rail of the other side. However, in other embodiments, both the transmission function and the reception function are implemented by a light barrier element integrated in a single housing, Provision may be made in accordance with another embodiment that a corresponding pair of transmission light barrier elements and reception light barrier elements use encoded signals in order not to interfere with adjacent light barrier elements. Provision may furthermore be made that a reception light barrier element may be configured to receive a plurality of differently encoded light pulses transmitted by a transmission light barrier element. A denser light grid may thereby be generated since the individual struts of the light grid no longer only run between a transmission/reception pair, but rather from one reception light barrier element to a plurality of transmission light barrier elements.

In other aspects, a rear running rail is arranged at a common side of the door element beside the first, front running rail and that both serve the guidance of the at least one door element and at least one light barrier element is arranged both in the front running rail and in the rear running rail. To carry out a specific advantageous travel path, it is of advantage for a door element, for example, to be guided in a different running rail at its lower edge than the upper edge of the door element. The two running rails are then typically "behind one another" and are preferably spaced apart from one another by less than 80 cm, less than 50 cm, and less than 30 cm. It is possible to provide a light grid by the present invention that runs from the cut-outs of the "front" running rail toward the cut-outs of the "rear" running rail. A cable connecting the light barrier elements of the rail arranged after one another then leads from a light barrier element that cooperates with the one running rail to a running rail that cooperates with the other running rail. The two running rails may substantially have the same features as were described above, forming part of a door system, where the door system has at least one travelable door element, at least one running rail for guiding the door element, and at least one light barrier element for detecting a free travel path of the door element, wherein the at least one running rail has a cut-out at or in which the at least one light barrier element is fastened.

In some aspects, the at least one running rail may run in a straight line and/or have an arcuate section. All of the running rails described above can accordingly be of straight-line design, but can also have an arcuate section or can comprise an arcuate section. A combination of a plurality of different shaped sections is also possible for the running rail.

Provision may further be made in accordance with a further aspect that the at least one light barrier element has a latch nose at which the light barrier element can be latched in the cut-out of the running rail and/or that the at least one light barrier element has a clamping cover that is configured to clamp and connect a cable, in particular a multi-core cable, simultaneously to the light barrier element. Provision may be made that this cable is used to implement the series connection of a plurality of light barrier elements arranged at the running rail.

Additionally, the door position in a door system that is configured in accordance with one of the variants discussed above may be determined. The method here includes detecting the state of the at least one light barrier element, wherein the state can be adopted either free of the door element or covered by the door element, with the arrangement position of the light barrier element coinciding with the closing edge of the door element on a change of state of the light barrier element and with a door control fixing the door position on the basis of this information.

In another embodiment, when the state of the light barrier element is free, the door element may be traveled in the closing direction until the state of the light barrier element changes or, when the state of the light barrier element is covered, the door element may be traveled or moved in the direction of opening until the state of the light barrier element changes and the arrangement position of the light barrier element coincides with the closing edge of the door element on a change of the state and a door control fixes the door position on the basis of this information.

Provision may be made in accordance with a further development that the door system has a first light barrier element and a second light barrier element, wherein, in a normal closing procedure of the door system, the second light barrier element changes its state from free to covered before the first light barrier element and, when the first and second light barrier elements are free, the door element is traveled in the closing direction until the state of the second light barrier element changes, when the first and second light barrier elements are covered, the door element is traveled in the opening direction until the state of the first light barrier element changes and, when the first light barrier element is free and the second light barrier element is covered, the door element is traveled in the closing direction until the state of the first light barrier element changes or the door element is traveled in the opening direction until the state of the second light barrier element changes.

BRIEF DESCRIPTION OF THE DRAWINGS

Further features, advantages and details of the invention will be explained with reference to the following description of the Figures.

DETAILED DESCRIPTION

Figure 1:
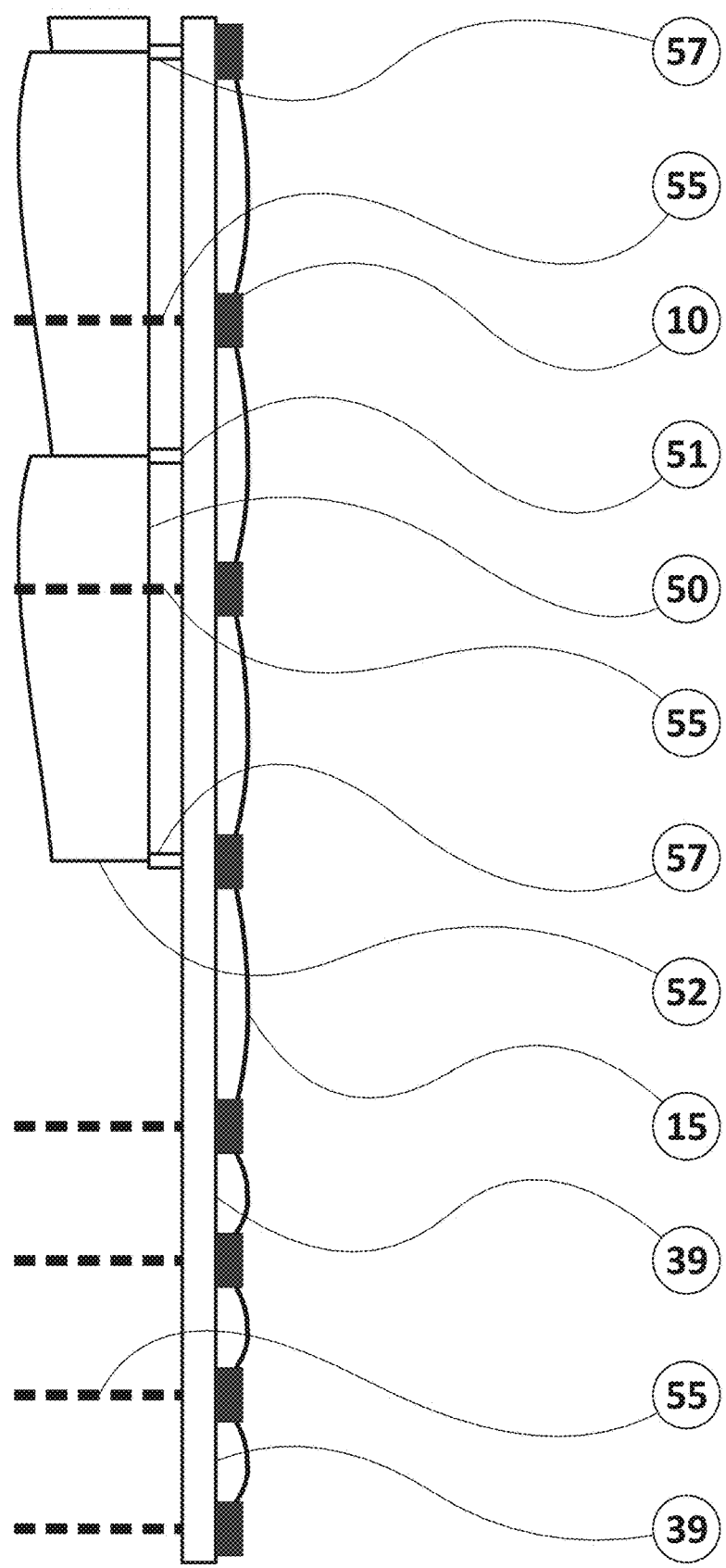
FIG. 1 is an illustration of a partial view of an embodiment of a door system with a running rail and a guide element guided therein.

FIG. 1 shows a partial view of a door system in accordance with the invention. The door system has a running rail 39 that guides a door segment 50 (also door element) at its left side in the representation of FIG. 1. The guidance of the door segment 50 may take place in the running rail 39 via rollers 51 that are received in a profile of the running rail 39. A plurality of individual light barrier elements 10 that emit a light beam 55, 57 on the side of the running rail 39 facing the door segment 50 are arranged on the side of the running rail 39 remote from the door segment 50. The plurality of light barrier elements 10 are here connected to one another in series by a ribbon cable 15 to supply each light barrier element 10 with energy and to provide a data line to a control unit where desired. As can furthermore be seen from FIG. 1, the distance of the plurality of light barrier elements 10 from one another does not have to be the same over the length of the running rail 39, but can vary. In the present case, the distance of the light barrier elements 10 from one another is smaller in a floor region of the running rail 39 than in section of the running rail 39 remote therefrom.

In one aspect, the transmitted light of a light barrier element 10 is only blocked when the roller 51 of the door segment 50 is arranged at the level of a respective light barrier element 10. An interruption of the light beam 57 only takes place then; otherwise the light beam 55 is not blocked. However, in another aspect the light beam 55, 57 is blocked by the door segment 50 when the latter is at the level of an associated light barrier element 10. Since, however, the level of the lower door edge 52 of a door segment 50 typically corresponds with the level of the lowest roller 51 in the running rail 39, the travel path of the door can also be tracked in the embodiment implemented in accordance with FIG. 1.

Figure 2A:
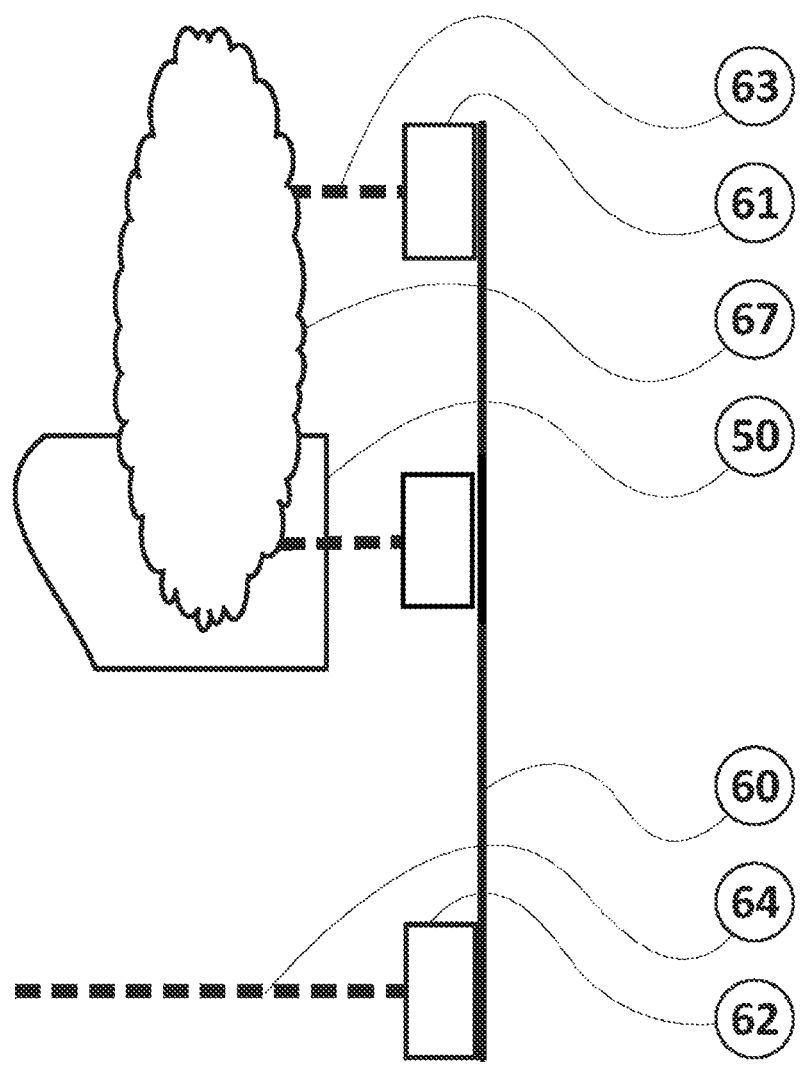
FIGS. 2A and 2B are an illustration of a partial view of an embodiment of a door system in which the running rail is arranged perpendicular to the plane of the paper.
Figure 2B:
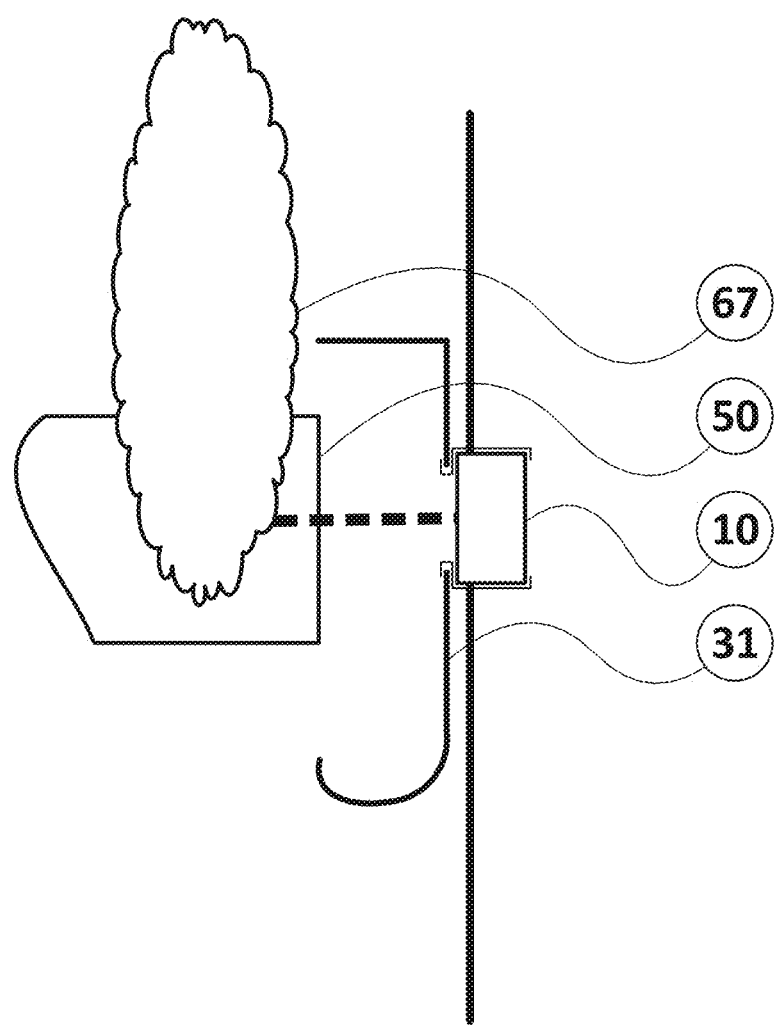

FIGS. 2A and 2B show a view of a door system when looking from below at a door segment 50 traveling down. The running rail 31 for the door extends out of the plane of the paper of FIGS. 2A and 2B. In addition to the light barrier element 10 described herein, conventional light grids 61, 62 are also shown for comparative purposes. As shown in FIG. 2A, conventional light grids 61, 62 or light barrier elements of conventional light grids 61, 62 cannot be installed directly in the running rail 31 for the door segment 50. Therefore, an obstacle 67 present in the travel path of the door segment 50 may not recognized due to the laterally offset arrangement of a conventional light grid 61, 62. If, for example, the light grid 62 with the light beam 64 emanating from it is looked at, it becomes clear that the obstacle 67 is not detected. If now a control relies exclusively on this signal from the light grid 62, there will be a collision between the door segment 50 and the obstacle 67. Only a light grid 61 arranged by chance at the correct side would detect the obstacle 67 by its interrupted light beam 63 here. The probability of a detection of the obstacle 67 is thus significantly smaller with a conventional implementation than with the implementation described herein. As seen with the door system described herein, the light beam of the light barrier element 10 here runs through a cut-out and/or perpendicular to a cut-out of the running rail 31 in which the door segment 50 is guided. An obstacle 67 arranged in the travel path of the door segment 50 is thus reliably detected. The conventional light grids 61, 62 spaced apart from the running rail 31 by a holder 60 cannot ensure identification of obstacles in the path of the door due to their offset arrangement with respect to the running rail 31.

Figure 3:
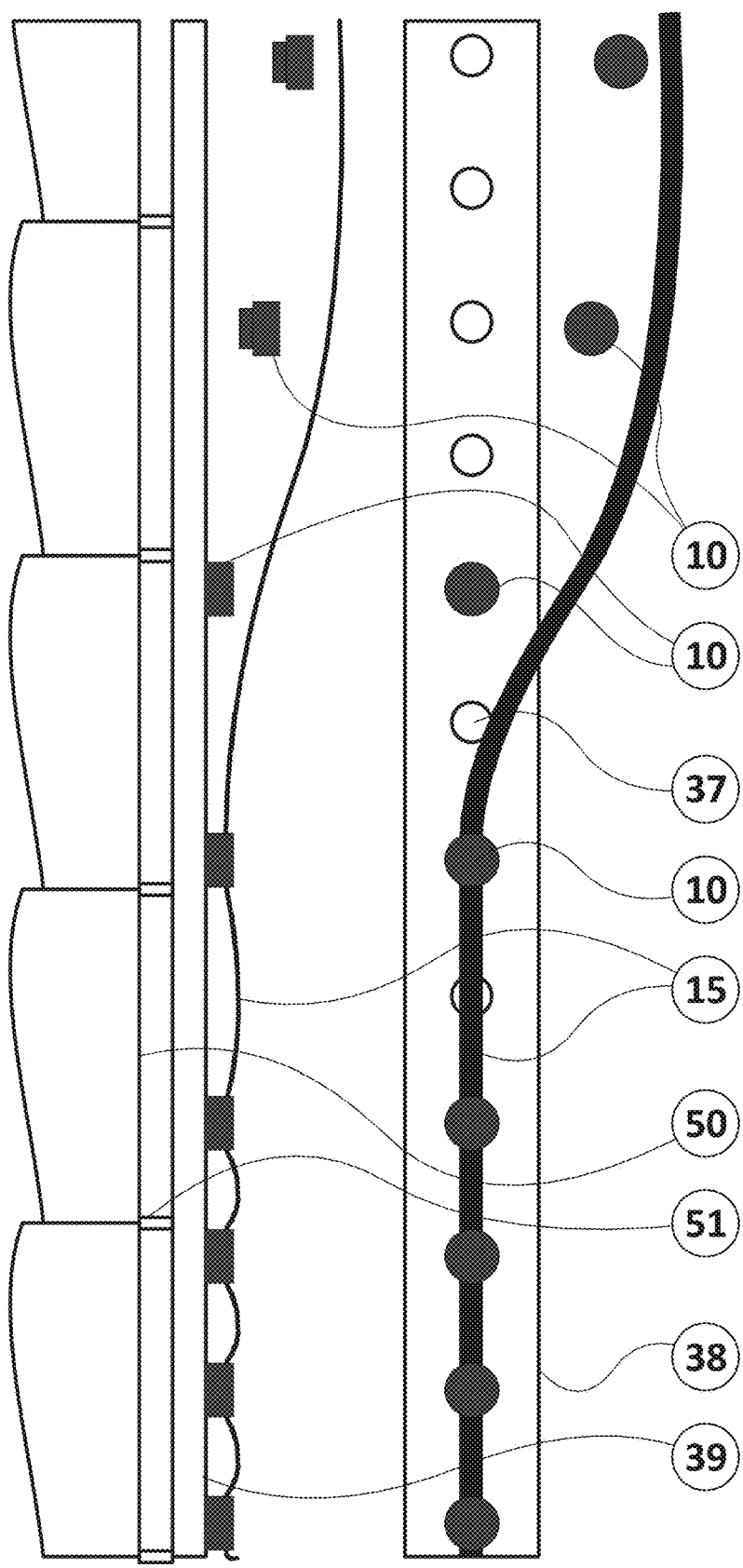
FIG. 3 is an illustration of a front view and a side view of an embodiment of a door system depicting the installation of light barrier elements.

FIG. 3 shows a plan view of a part of a door system at the left side, whereas the right side represents a side view. The mutually corresponding views show an installation procedure of the individual light barrier elements 10 at or in a cut-out 37 of the running rail 39. Unlike the prior art, it is now no longer necessary to install conventional light grids in a complex manner in the vicinity of the running rail. The invention rather allows a direct attachment of the individual light barrier elements 10 in cut-outs 37 of the running rail 39. After a fastening of the light barrier element 10 in an associated cut-out 37, the plurality of light barrier elements arranged in the cut-outs 37 are connected to a common cable 15 one after the other. A light grid is thus formed that can be formed simply and on site in or at the running rail 39 depending on the requirements of the individual case. It is advantageous here that the light barrier elements 10 can be supplied singly and can be plugged into the cut-outs 39 provided therefor individually according to the respective requirements of a specific door system. The disadvantages known from the prior art in the provision of light grids for door systems are thus completely omitted. The preparation of the light grid in accordance with the invention is particularly simple since after an attachment of the light barrier elements 10 in the desired cut-outs 37 of the running rail 39, the connection to the cable 15 is only prepared between the different light barrier elements in a subsequent workstep.

Figure 4:
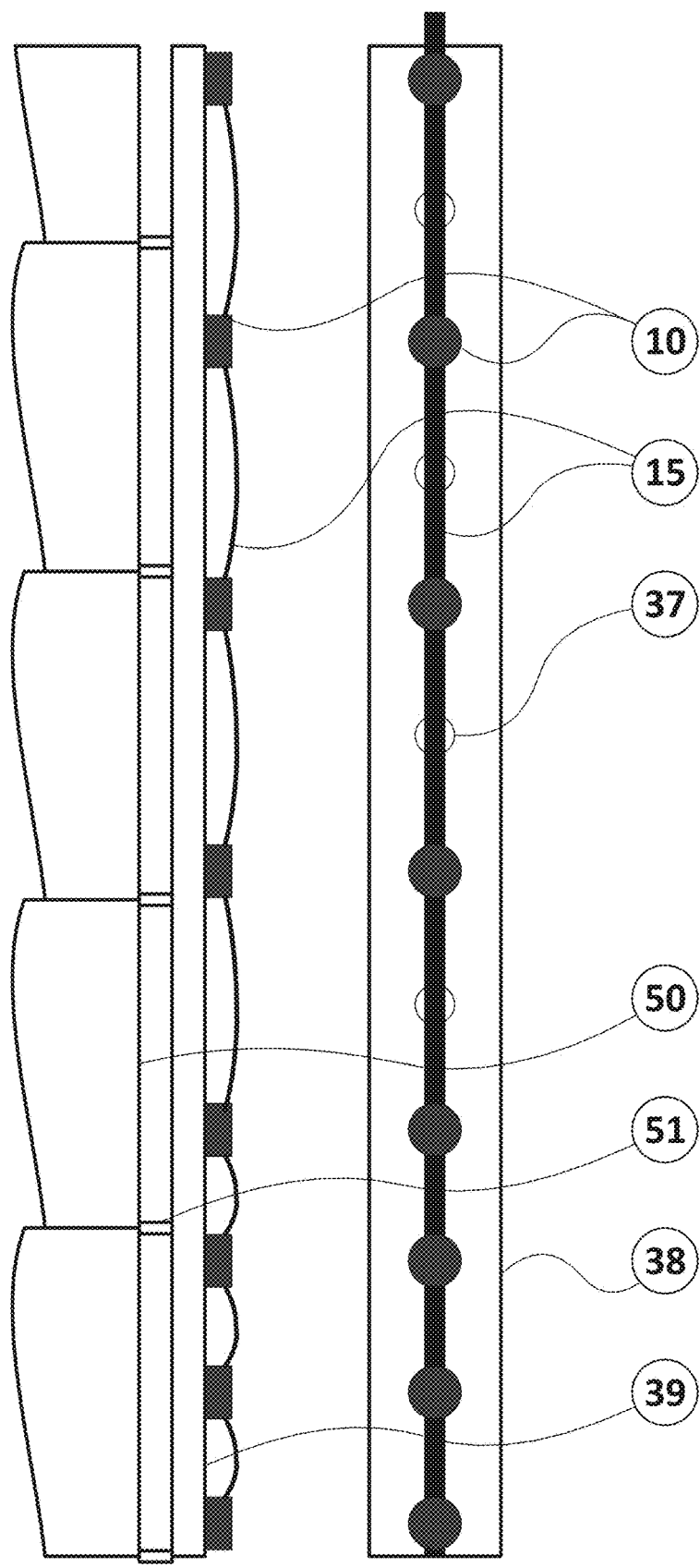
FIG. 4 is an illustration of a front view and a side view of an embodiment of a door system with installed light barrier elements.

FIG. 4 shows a similar representation to FIG. 3, with the difference that now the light barrier elements 10 are introduced into their associated cut-outs 37 or are fastened there and are connected to a cable 15 one after the other.

Figure 5:
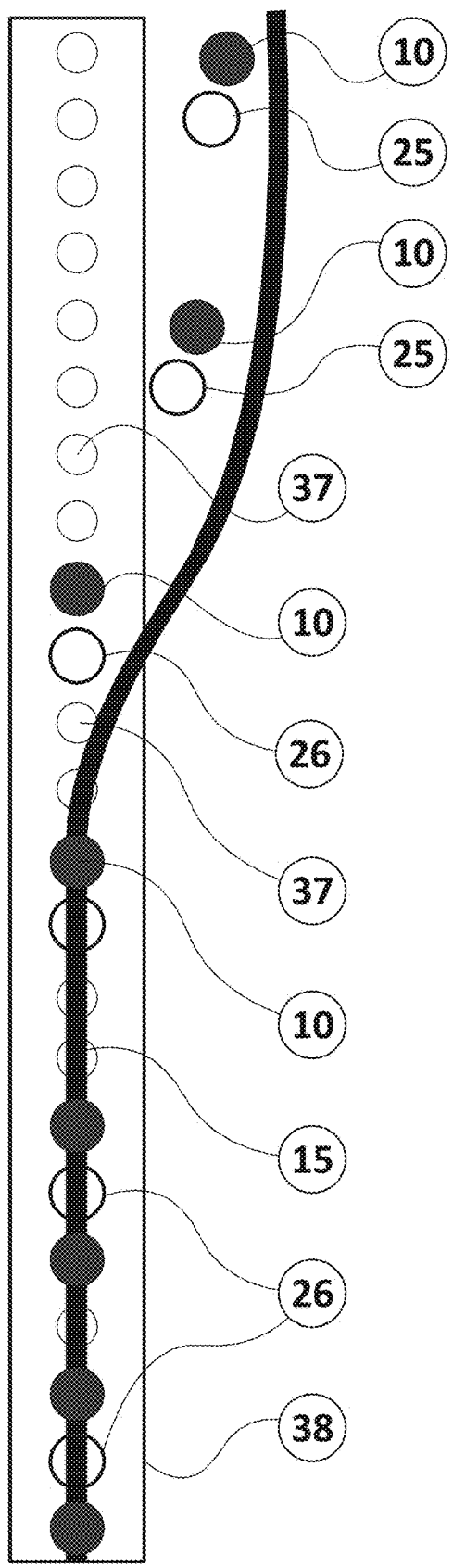
FIG. 5 is an illustration of a side view of an embodiment of a running rail for a door system in a partly installed state.

FIG. 5 shows a side view of running rail 39 that has a plurality of cut-outs 37 as pre-punched openings of the running rail 38. Running rails 38 are available that are already supplied by manufacturers with cut-outs 37 in the form of fastening openings by which running rails 38 are screwed to installation material 25, 26. In accordance with a further embodiment, the cut-outs 37 may be arranged at smaller distances than would be required for a fastening of the running rails 38 (for example at a distance of 10 cm instead of 40 cm). Thus, either installation material 25, 26 or a light barrier element may be used with the cut-out 37. The production process of the door manufacturer is hereby substantially simplified in the manufacture of the running rail 38 and the customer can use the light barrier elements 10 very flexibly. The cut-outs accordingly serve not only the reception or the fastening of a light barrier element 10, but also use with a fastening means 25, 26 for installation of the running rail 38 itself.

Figure 6:
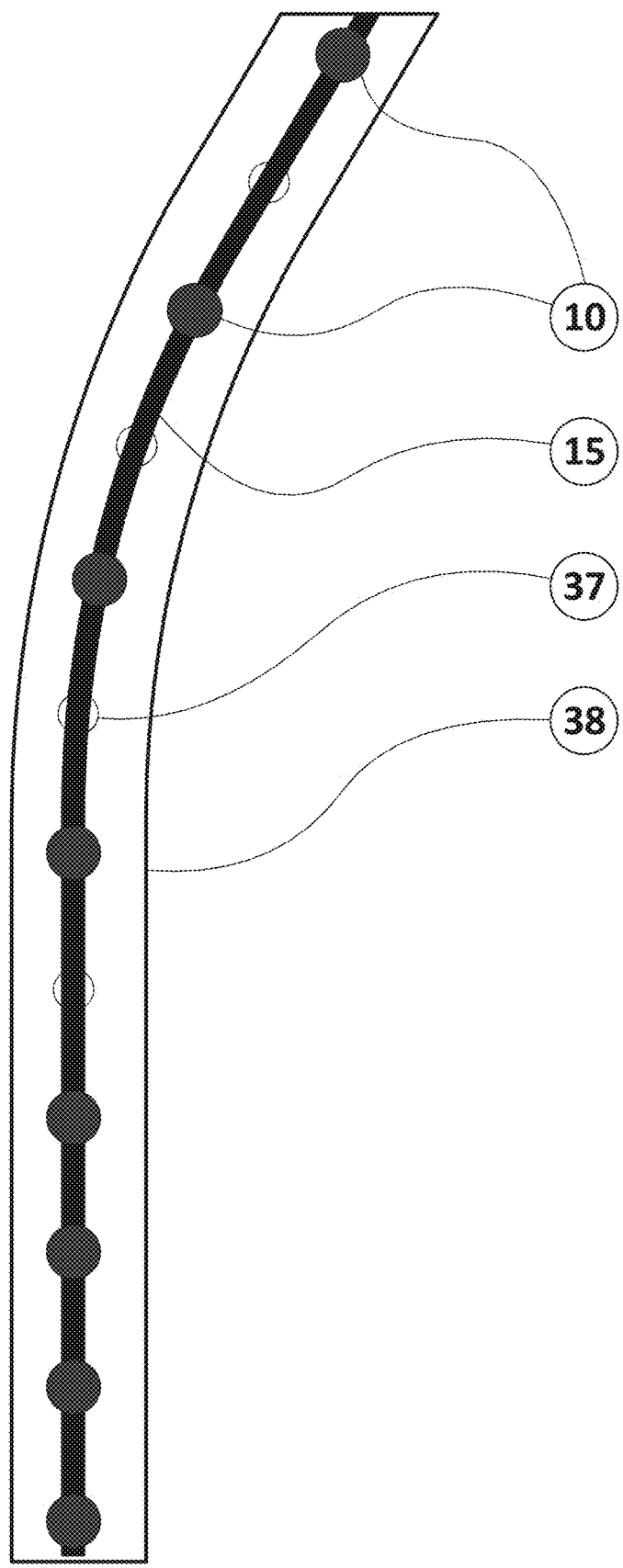
FIG. 6 is an illustration of an embodiment of an arcuate running rail in a side view with light barrier elements.

FIG. 6 shows a side view of a running rail 38 that is arcuate in the upper section and that is provided with a light grid. Most light barriers are usually supplied in straight bar shape and can accordingly not be adapted to the bend of a door or of the running rail. This is, however, possible in accordance with embodiments described herein since due to the individual light barrier elements 10 and the arrangement thereof at or in the cut-outs 37 of the running rail 38, any section of the light grid may be formed in this manner and may track the shape of the running rail. The bend of the running rail 38 can thus be optimally followed. Larger gaps such as those that arise with the arrangement of conventional light barrier elements piece-wise and in a straight form are therefore no longer present.

Figure 7:
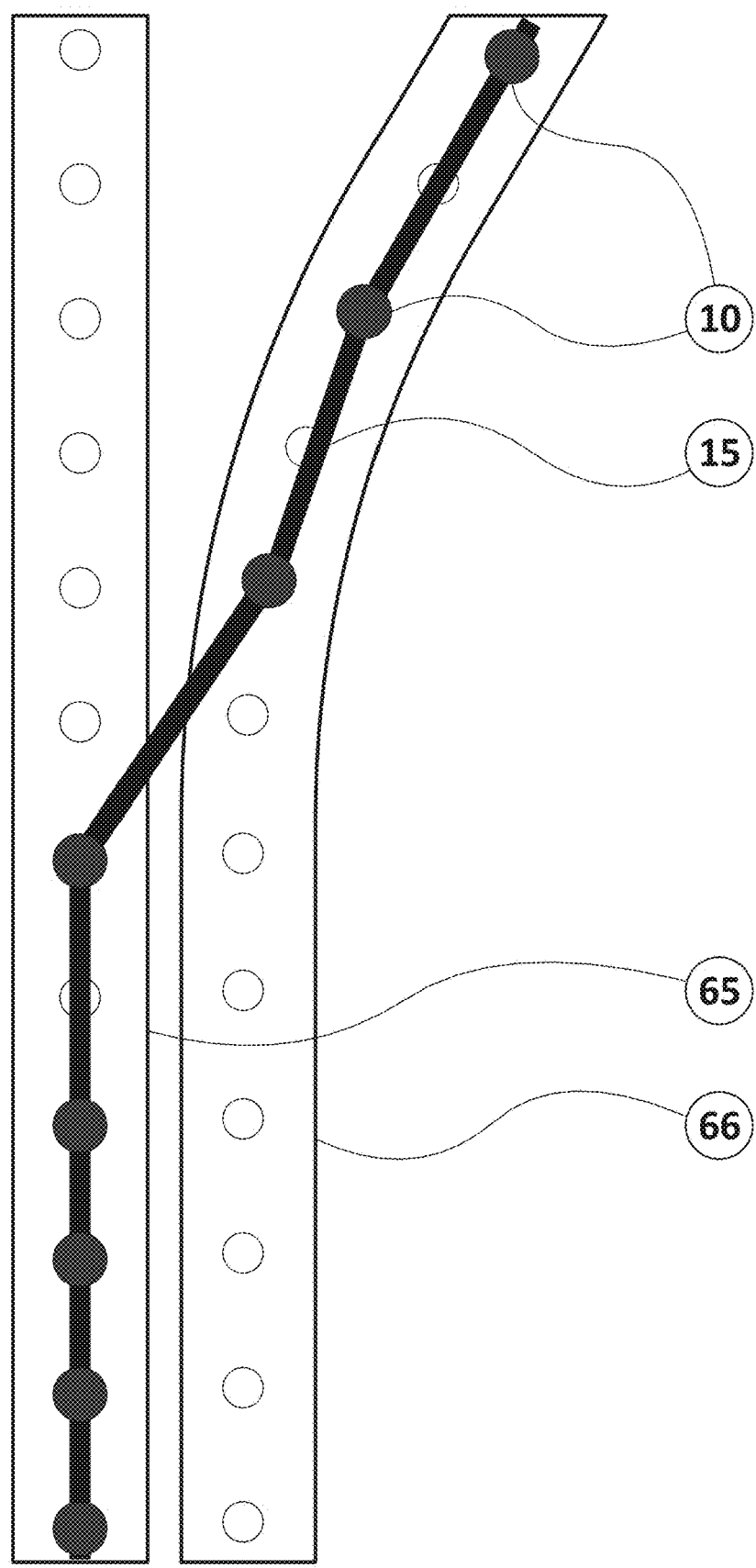
FIG. 7 is an illustration of a side view of an embodiment of two running rails arranged behind one another, with one of them having an arcuate section and with a light grid having a plurality of light barrier elements extending over the two running rails.

FIG. 7 shows a side view of a door system that has a plurality of running rails 65, 66 on a side of the door system. There is thus a front running rail 65 and a rear running rail 66 that may each cooperate with a door segment (not shown) of a door system. Since it is necessary in a number of configurations of door systems to arrange two running rails behind one another, it is also advantageous to change between the two running rails with the light grid. This cannot be implemented with conventional light grids. It is, however, possible to distribute the light barrier elements 10, of the front running rail 65 for example, over the rear running rail 66, whereby a light grid is generated whose individual light barrier elements are arranged both in the one and in the other running rail. It is thereby possible to distribute the light barrier elements 10 optimally over the running rails 65, 66 arranged behind one another using the system described herein.

Figure 8:
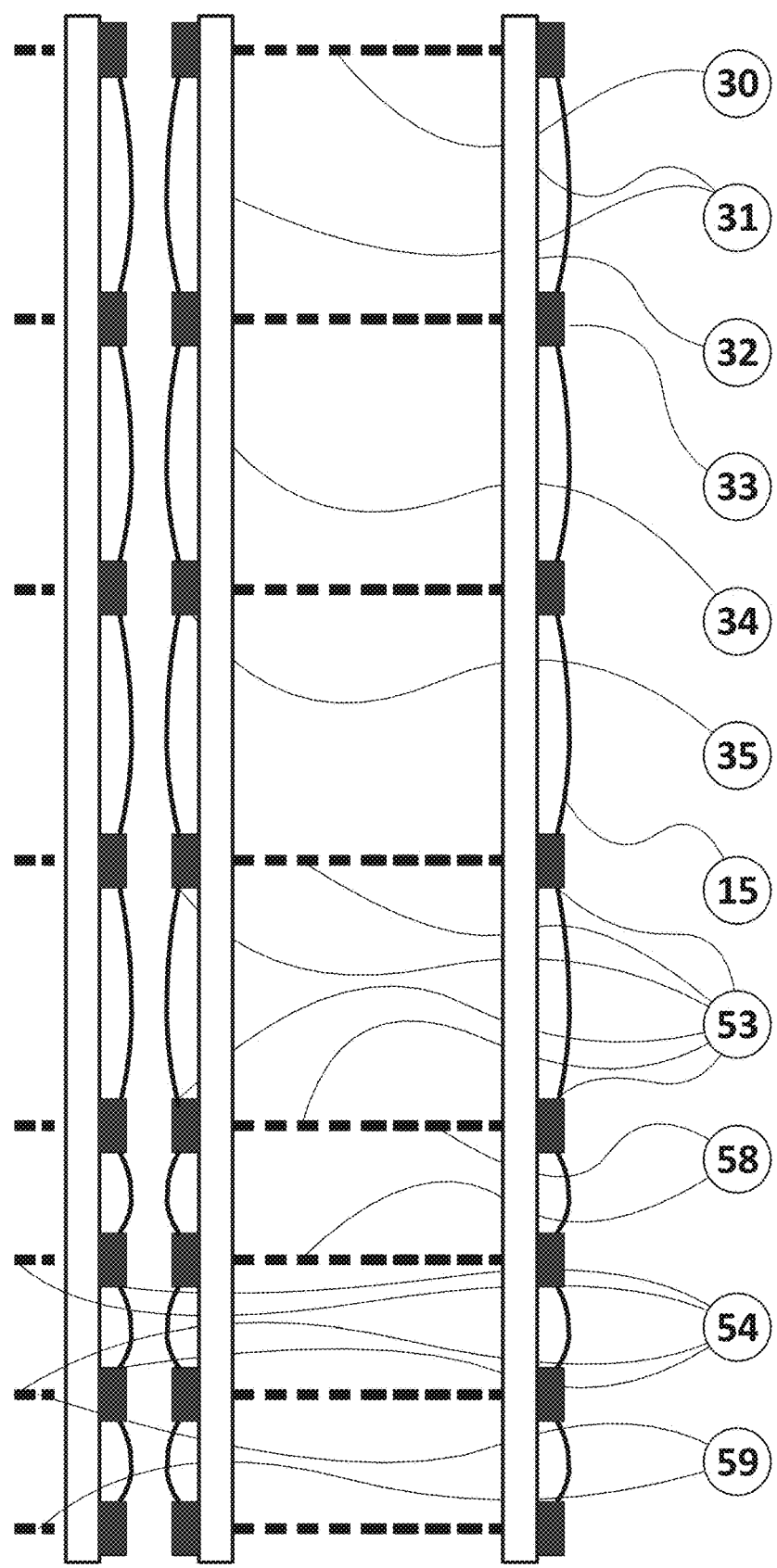
FIG. 8 is an illustration of an embodiment of a representation of two running rails with a plurality of light barrier elements.

FIG. 8 shows two running rails 31 of a first door and to the left thereof a further running rail of a second door. It is possible here that transmission light barrier elements 33 are arranged in a first running rail 32 that correspond to reception light barrier elements 35 of the second running rail 34. Only transmission light barrier elements 33 are therefore arranged on one side, for example of the running rail 32 and only reception light barrier elements 35 are arranged on the other side, of the running rail 34. Provision can furthermore be made here that each transmission light barrier element 33 transmits a unique encoded signal that is uniquely recognized and evaluated by the corresponding reception light barrier element 35. Provision can furthermore also be made that not only the light beams 58 of a first light grid 53 are coded among one another, but rather likewise the light beams 58 of the first light grid 53 are encoded with respect to further light grids 54 or to the light beams 59 of other light grids. No incorrect detection can thus occur when doors are arranged closely next to one another.

Figure 9:
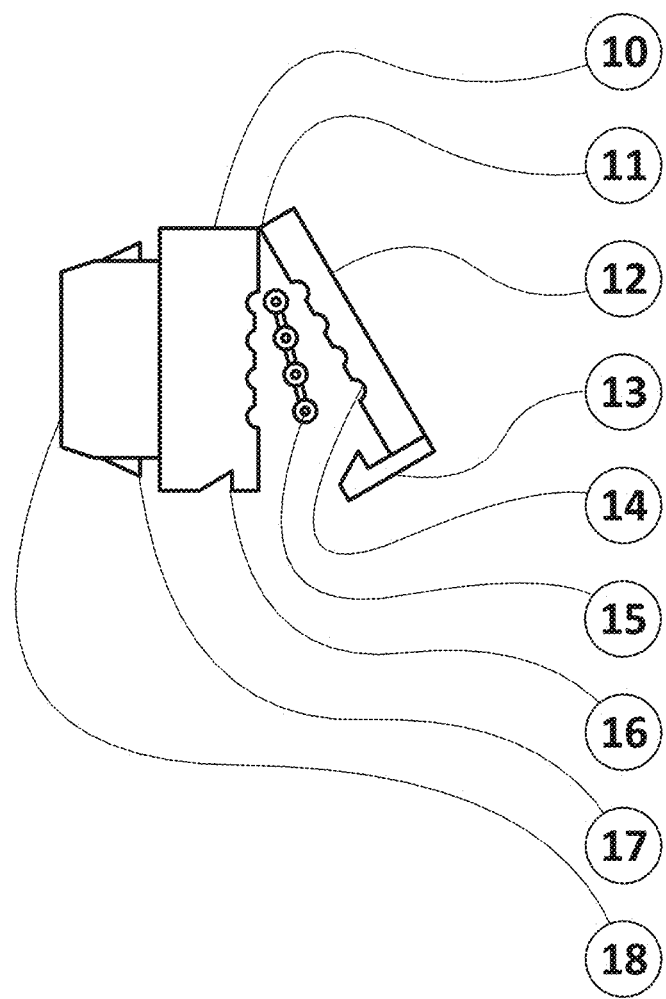
FIG. 9 is an illustration of a basic sketch of an exemplary light barrier element.

FIG. 9 shows a possible embodiment of the light barrier element 10 that can cooperate with the cut-out 37 of a running rail 38, 39. The light barrier element 10 here has a cover 12 that is connected to the main housing of the light barrier element via a hinge 11 that can be molded on. The cover 12 may have a hook 13 for the cover latching at its section remote from the hinge 11. A corresponding latch 16 for the cover hook 13 is present at the main element of the light barrier element 10. In a closed state of the cover, there may be a receiver 14 for a ribbon cable 15 so that a ribbon cable 15 located in the receiver can be fastened thereto in a latched state of the cover 12 and is also in contact with the light barrier element 10. There may accordingly be contact pins in the receiver 14 that penetrate into the ribbon cable 15 on a latching of the cover 12 and contact the corresponding wire or also a plurality of wires of the ribbon cable 15. A particularly simple and fast connection of light barrier elements 10 arranged spaced apart from one another is thereby possible. The so-called lower part 18, that is introduced from a side of the running rail and projects at the other side of the running rail is located at a section of the light barrier element 10 spaced apart from the cover section. For a connection to the cut-out of the running rail that is as simple as possible, a latch element 17 is likewise present there that is used for a latching of the light barrier element 10 to a cut-out of the running rail.

Figure 10:
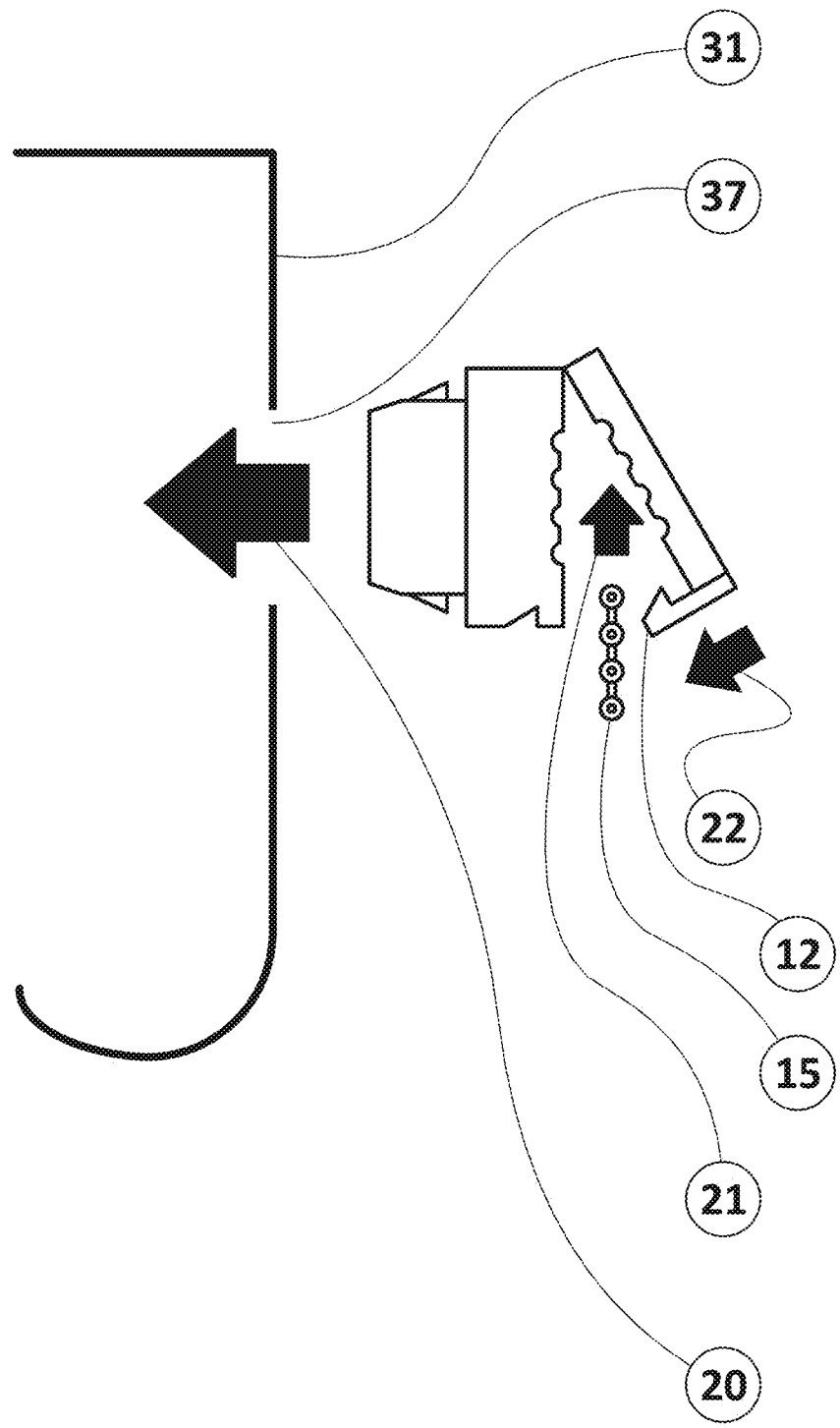
FIG. 10 is an illustration representation showing a fastening option of a light barrier element to a running rail.

FIG. 10 shows a somewhat more detailed implementation of the installation of the light barrier element at the running rail 31 of a door system. The arrows here represent worksteps. In a first step 20, the light barrier element 10 is connected to the running rail 31 by latching the latch nose of the lower part of the light barrier element into the cut-out 37 of the running rail 31. In a second step 21, the ribbon cable 15 may then be placed into the receiver section of the light barrier element, in a third step 22, the cover 12 of the light barrier element 10 is closed and an electric connection is established between the ribbon cable 15 and the light barrier element 10.

Figure 11:
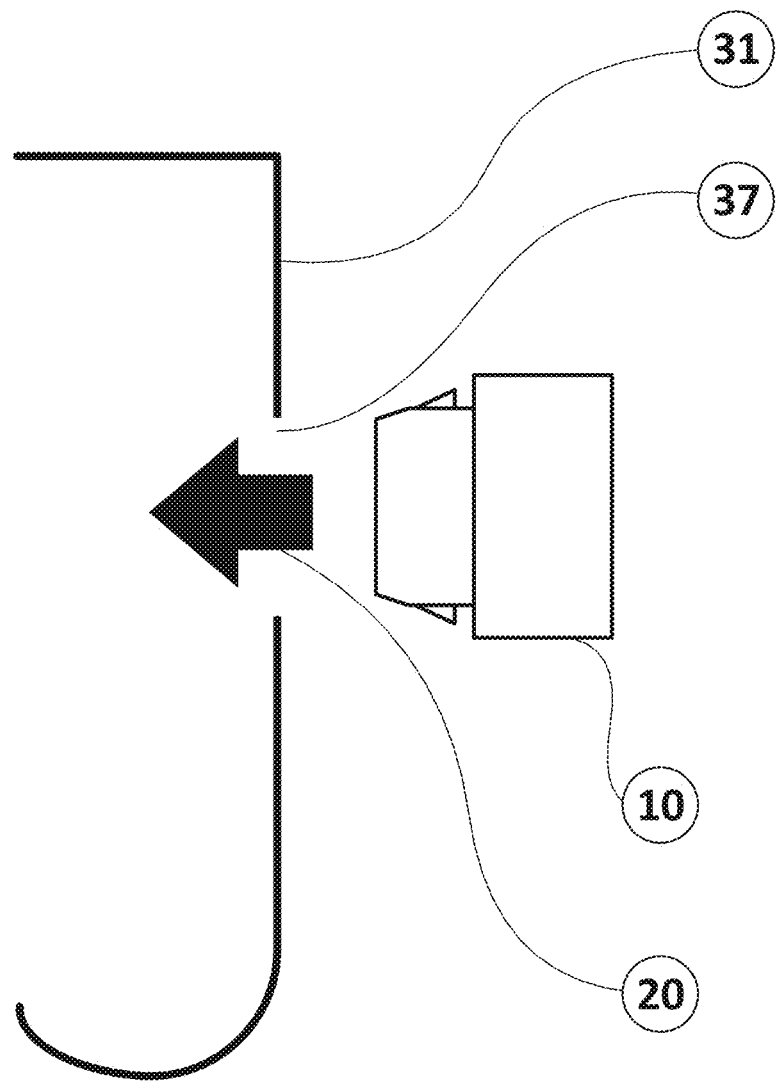
FIG. 11 is a further arrangement option for fastening the light barrier element to the running rail.

FIG. 11 again shows the first workstep 20 in which the light barrier element 10 is latched into the cut-out 37 of the running rail 31.

Figure 12:
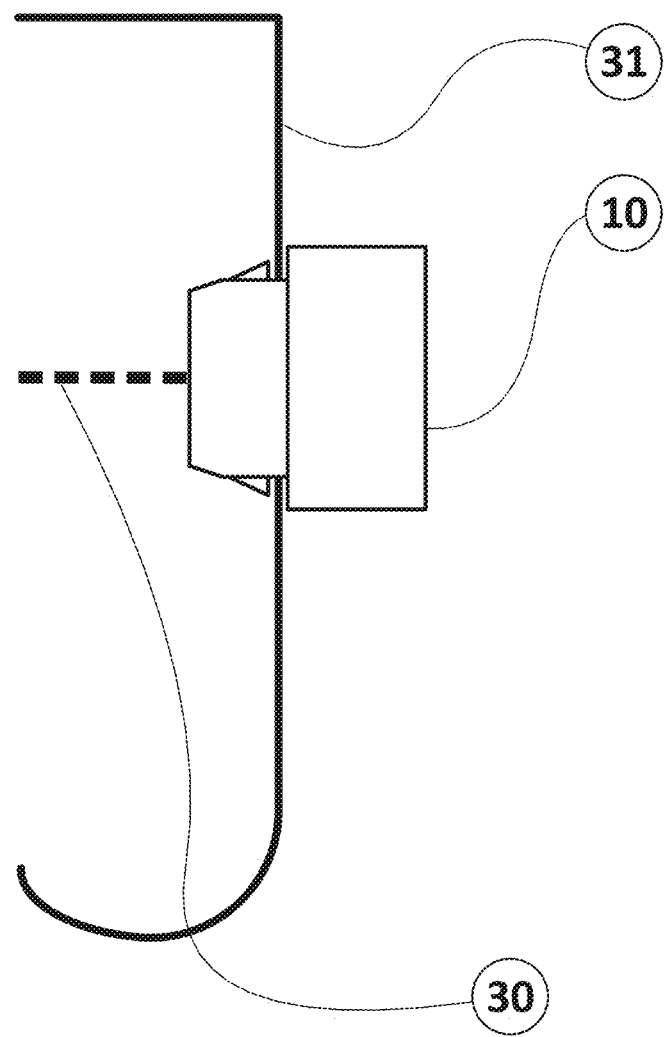
FIG. 12 is an illustration of an embodiment of a light barrier element that is fastened to a running rail.

FIG. 12 shows the light barrier element 10 in an arrangement position that is connected to the running rail 31 and in which the light beam 30 is transmitted by the light barrier element 10. It can be recognized in this representation that a large part of the light barrier element is arranged at the side of the running rail 31 remote from the door element and a spatially smaller part of the light barrier element is present at the side of the light barrier element 10 facing the door element. The reason for this is typically that the running rail 31 does not provide much room for the arrangement of the light barrier element 10 since the roller guided in the running rail 31 takes up a lot of room.

Figure 13:
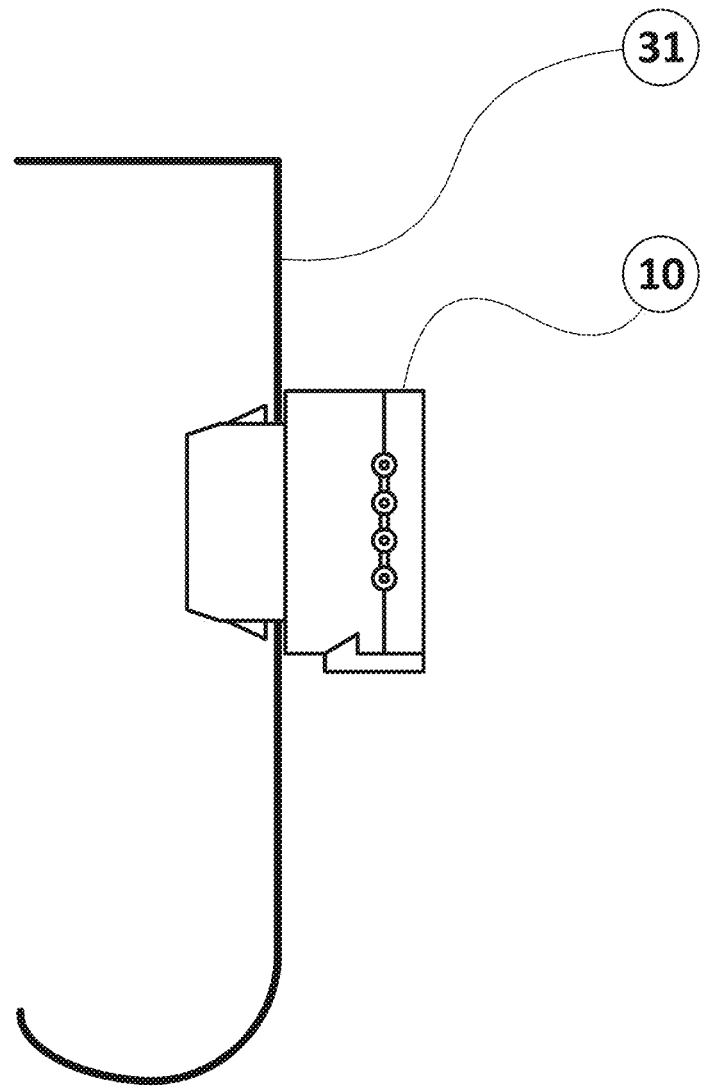
FIG. 13 is an illustration of an embodiment of a light barrier element that is fastened in a cut-out of the running rail and that is connected to a cable.

FIG. 13 shows the light barrier element 10 in a position arranged in the cut-out of the running rail 31, with now the cover of the light barrier element 10 being in a closed position, whereby the clamped ribbon cable is electrically connected to the light barrier element 10.

Figure 14:
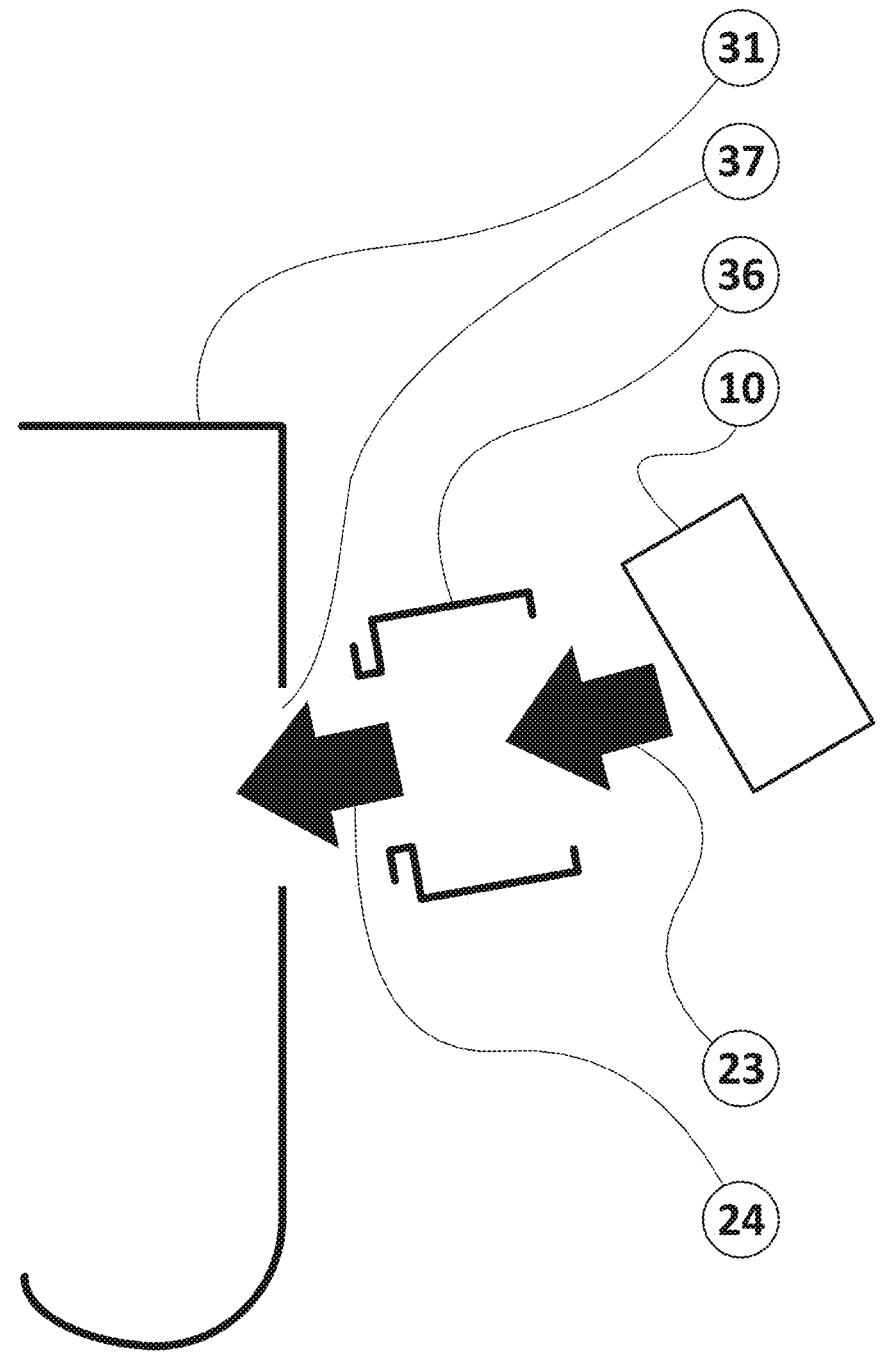
FIG. 14 is an illustration of a further fastening alternative in a cut-out of the running rail for the light barrier element.

FIG. 14 shows a further method for fastening the light barrier element 10 to the cut-out 37. It is clear to a person skilled in the art that the light barrier elements 10 are not only fastenable in the cut-out, but also at the cut-out or in/at the profile of the running rail 31. This is, for example, possible via the shown holder 36 for the light barrier element 10. The arrows 23,24 are again associated with worksteps. The light barrier element 10 is pressed into the holder 36 by a first workstep 23. The holder 36 holding the light barrier element 10 is subsequently pressed into or hung on the cut-out 37 that can be a pre-stamped opening of the running rail 31 at second workstep 24.

Figure 15:
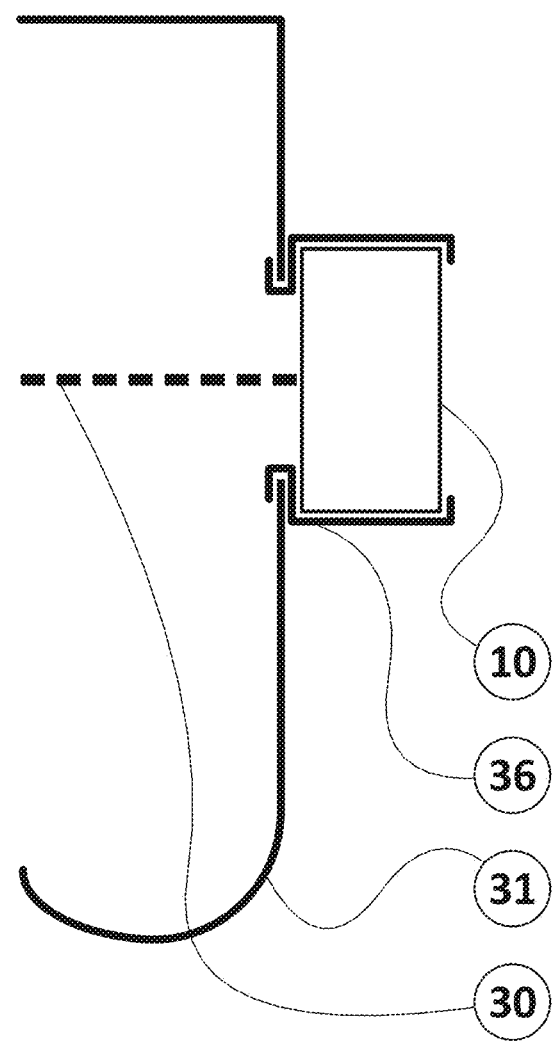
FIG. 15 is a depiction of the light barrier element fastened in accordance with the alternative to the cut-out of the running rail of FIG. 14.

The result of a light barrier element 10 fastened to the cut-out 37 via a holder 36 can then be seen in FIG. 15. The light beam 30 then penetrates through the cut-out on the side of the running rail 31 that faces the door element (not shown). In this representation, the light barrier element 10 is therefore installed completely behind the running rail 31 since the rollers only leave very little room for the arrangement of the sensor at the side of the door, for example.

The invention claimed is:

1. A door system comprising:
   at least one travelable door element;
   at least one running rail for guiding the at least one travelable door element; and a plurality of light barrier elements for detecting a free travel path of the at least one travelable door element, wherein the at least one running rail has at a plurality of cut-outs,
   wherein the plurality of light barrier elements are separate light barrier elements that are fastened in the plurality of cut-outs, wherein each light barrier element of the plurality of light barrier elements has a latch nose by which the light barrier element is latchable in the plurality of cut-outs and has a clamping cover that is configured to clamp and connect a cable of the door system simultaneously to the light barrier element such that each of the plurality of light barrier elements is configured to be connected to the cable of the door system via a connection only prepared in a subsequent workstep after the plurality of light barrier elements are fastened in the plurality of cut-outs.

2. The door system in accordance with claim 1, wherein the plurality of cut-outs are passage holes that extend through the at least one running rail.

3. The door system in accordance with claim 1, wherein the plurality of light barrier elements are arranged predominantly or completely at a side of the at least one running rail that is remote from the at least one travelable door element.

4. The door system in accordance with claim 1, wherein the plurality of cut-outs are along the length of the at least one running rail, wherein the plurality of cut-outs are arranged equidistant from one another and/or extending over the total length of the at least one running rail.

5. The door system in accordance with claim 4, wherein each light barrier element of the plurality of light barrier elements is fastened to each of the plurality of cut-outs of the at least one running rail.

6. The door system in accordance with claim 5, wherein the plurality of light barrier elements generate a light grid, and wherein each light barrier element of the plurality of light barrier elements is connected to the cable via a series connection, wherein the cable is a common cable.

7. The door system in accordance with claim 1 further comprising a second running rail for guiding the at least one travelable door element, wherein the at least one running rail is a first running rail, and wherein the first running rail and the second running rail are arranged at different sides of the at least one travelable door element and a surface spanned between the first running rail and the second running rail is an opening coverable by the at least one travelable door element.

8. The door system in accordance with claim 1, wherein the plurality of light barrier elements are transmission light barrier elements and/or reception light barrier elements and, on a presence of the at least one running rail, wherein the at least one running rail is a first running rail and a second running rail, wherein the first running rail and the second running rail are at oppositely disposed sides of the at least one travelable door element, only transmission light barrier elements are present at the first running rail of a one side of the at least one travelable door element and only corresponding reception light barrier elements are present at the second running rail of an other side of the at least one travelable door element.

9. The door system in accordance with claim 8, wherein a corresponding pair of transmission light barrier elements and reception light barrier elements uses encoded signals in order not to interfere with adjacent light barrier elements.

10. The door system in accordance with claim 1, wherein the at least one running rail comprises a rear running rail and a first, front running rail, wherein the rear running rail is arranged at a common side of the at least one travelable door element beside the first, front running rail and the rear running rail and the first, front running rail guide the at least one travelable door element; and the plurality of light barrier elements are arranged in the first, front running rail and in the rear running rail, with multiple of the plurality of light barrier elements of the front running rail and of the rear running rail connected via the cable.

11. The door system in accordance with claim 1, wherein the at least one running rail extends in a straight line and/or has an arcuate section.

* * * * *